United States Patent [19]
Komeyama

[11] Patent Number: 4,955,741
[45] Date of Patent: Sep. 11, 1990

[54] UNIVERSAL JOINT
[75] Inventor: Nobuo Komeyama, Osaka, Japan
[73] Assignee: Koyo Seiko Co., Ltd., Osaka, Japan
[21] Appl. No.: 329,740
[22] Filed: Mar. 28, 1989
[30] Foreign Application Priority Data
  Mar. 30, 1988 [JP] Japan .................... 63-43437
[51] Int. Cl.⁵ .................... F16B 7/10; F16B 3/00
[52] U.S. Cl. .................... 403/57; 403/63; 403/74
[58] Field of Search .............. 403/57, 58, 63, 74
[56] References Cited
  U.S. PATENT DOCUMENTS 3,177,838  4/1965  Grimes ............... 114/230
  3,683,839  8/1972  Harbish .............. 114/249
  4,155,670  5/1979  Stafford ............. 403/114 X
  4,206,717  6/1980  Okuda ............... 114/230
  4,297,965 11/1981  Horton et al. ....... 403/342 X
  4,385,673  5/1983  Ott, Jr. ............. 403/57 X
  4,717,288  1/1988  Finn et al. ......... 403/220 X
  4,755,078  7/1988  Blumberg et al. .... 403/50 X

FOREIGN PATENT DOCUMENTS 57-20898  6/1982  Japan .
  63-43437  3/1988  Japan .

Primary Examiner—Randoph A. Reese
Assistant Examiner—Carol I. Bordas
Attorney, Agent, or Firm—Armstrong, Nikaido, Marmelstein, Kubovcik & Murray

[57] ABSTRACT

A universal joint includes a pair of yokes each having two trunnions projecting radially thereof, and an annular intermediate ring having bearings arranged on two diametrical lines thereof intersecting each other at right angles for supporting the respective trunnions. An annular central cover having a spherical outer surface is fixedly intimately fitted around the intermediate ring. Between the ring and a connecting flange at the outer end of each yoke, a collar is formed on the yoke. A pair of annular side covers each having a spherical inner surface slidable in contact with the spherical outer surface of the central cover each have an outer end portion horizontal in section and fixed to the periphery of the collar. An annular seal member in intimate contact with the outer surface of the central cover is provided at the inner end portion of each side cover. A clearance required for the sliding movement of the side covers is formed between the inner ends of the side covers. The connecting flange is so sized as to permit the side cover to pass thereover.

8 Claims, 4 Drawing Sheets

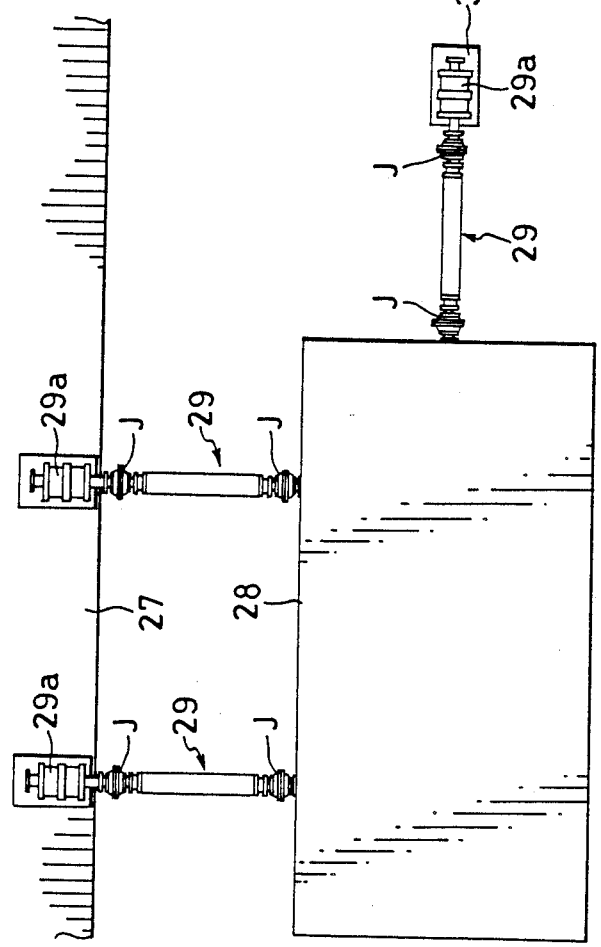
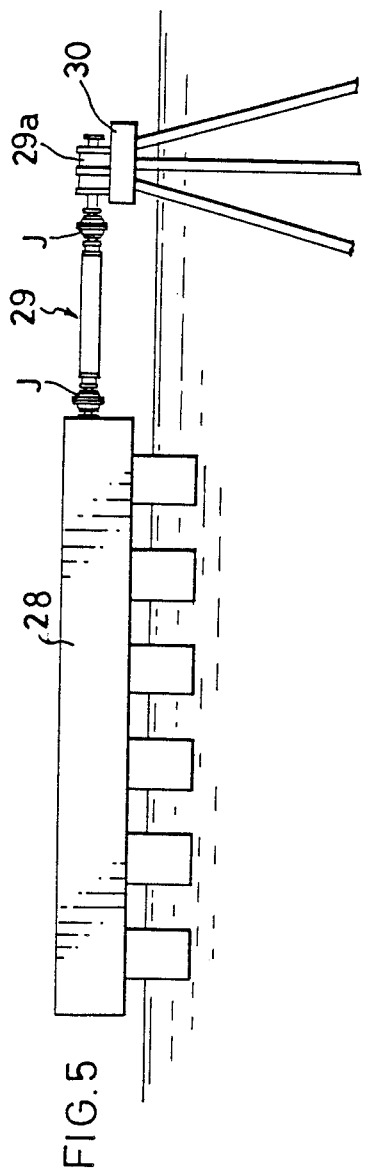
FIG.4
FIG.5

UNIVERSAL JOINT

BACKGROUND OF THE INVENTION

The present invention relates to universal joints, and more particularly to universal joints suitable for use in mooring devices.

Universal joints having high waterproofness are already known which include those disclosed in U.S. Pat. No. 4,206,717 and Examined Japanese Utility Model Publication No. 20898/82. These joints generally comprise a pair of yokes each having two trunnions projecting radially thereof, an annular intermediate ring having bearings arranged on two diametrical lines thereof intersecting each other at right angles for supporting the respective trunnions of the yokes, an annular projection having a spherical outer surface and formed on each of the yokes between the intermediate ring and a connecting flange at the outer end of the yoke, a pair of annular side covers each having an inner end fixed to the side edge portion of the intermediate ring and a spherical inner surface slidably in contact with the spherical outer surface of the annular projection, an annular seal member provided at the outer end of each side cover and in intimate contact with the spherical outer surface of the annular projection, and bearing holding closures closing bearing holes formed in the intermediate ring and fixed by setscrews to stepped portions of the intermediate ring around the holes, with a washer provided between the closure and the outer face of each trunnion. Each of the side covers comprises a pair of divided cover segments having connecting walls lapping over each other at their opposed ends and joined together with bolts and nuts.

With the universal joint described above, the side cover comprises two divided segments because the side cover, if in the form of an annular integral member, can not be passed over the connecting flange when the side cover is to be fixed to the intermediate ring after the pair of yokes and the intermediate ring are assembled, the outer end of the side cover, as well as its inner end, being diametrically much smaller than the connecting flange. If it is attempted to decrease the diameter of the connecting flange to avoid the interference of the flange with the annular side cover, the joint is unable to have any connecting portion. Accordingly, the annular side cover must invariably be divided into two segments, whereas the joint of the two cover segments is then likely to permit penetration of water therethrough. This problem is attributable to the structure that the spherical inner surface of the side cover is made slidable in contact with the spherical outer surface of the annular projection of the yoke. Furthermore, the weight of the universal joint itself acts on the setscews for fixing the holding closure and is therefore likely to cause damage to the bolts. Further to protect the sealed surface from corrosion, the yoke needs to be surface-treated as by building up or thermal spraying with SUS, but this procedure is cumbersome and results in a cost increase. When the universal joint is deformed in its entirety owing to a tensile axial force acting thereon, the side cover will be subjected to the force and is likely to break.

SUMMARY OF THE INVENTION

The present invention has overcome the foregoing problems and provides a universal joint including a pair of yokes each having two trunnions projecting radially thereof, and an annular intermediate ring having bearings arranged on two diametrical lines thereof intersecting each other at right angles for supporting the respective trunnions of the yokes, the universal joint comprising an annular central cover fixedly intimately fitted around the intermediate ring and having a spherical outer surface, a collar formed on each of the yokes and positioned between the intermediate ring and a connecting flange at the outer end of the yoke, a pair of annular side covers each having an outer end portion of horizontal section fixed to the periphery of the collar in intimate contact therewith and a spherical inner surface slidable in contact with the spherical outer surface of the central cover, and an annular seal member provided at the inner end portion of each of the side covers and in intimate contact with the outer surface of the central cover, the inner ends of the pair of side covers being spaced apart from each other by a clearance required for the sliding movement of the side covers. Accordingly, even when each connecting flange has such a diameter as to permit the annular side cover to pass thereover, the flange can be given a sufficient connecting portion, consequently eliminating the need to divide the side cover into two segments and completely obviating the problem of penetration of water due to the division.

Further with the universal joint of the invention, the central cover is fixed to the intermediate ring in place of the holding closures, so that the gravity acting on the joint is not withstood by set screws.

To protect the sealed surface, the central cover can be treated for this purpose instead of the pair of yokes. The treatment can therefore be carried out very efficiently at a low cost.

Furthermore, even when the joint is deformed in its entirety owing to an axial tensile force acting thereon, the side covers remain free of the force and are accordingly free of the likelihood of damage.

The invention will be described in greater detail with reference to the accompanying drawings.

BRIEF DESCRIPTION OF THE DRAWINGS

FIGS. 4 and 5 are a plan view and a side elevation showing universal joints of the invention as used in a mooring device.

DESCRIPTION OF THE PREFERRED EMBODIMENTS

Figure 1:
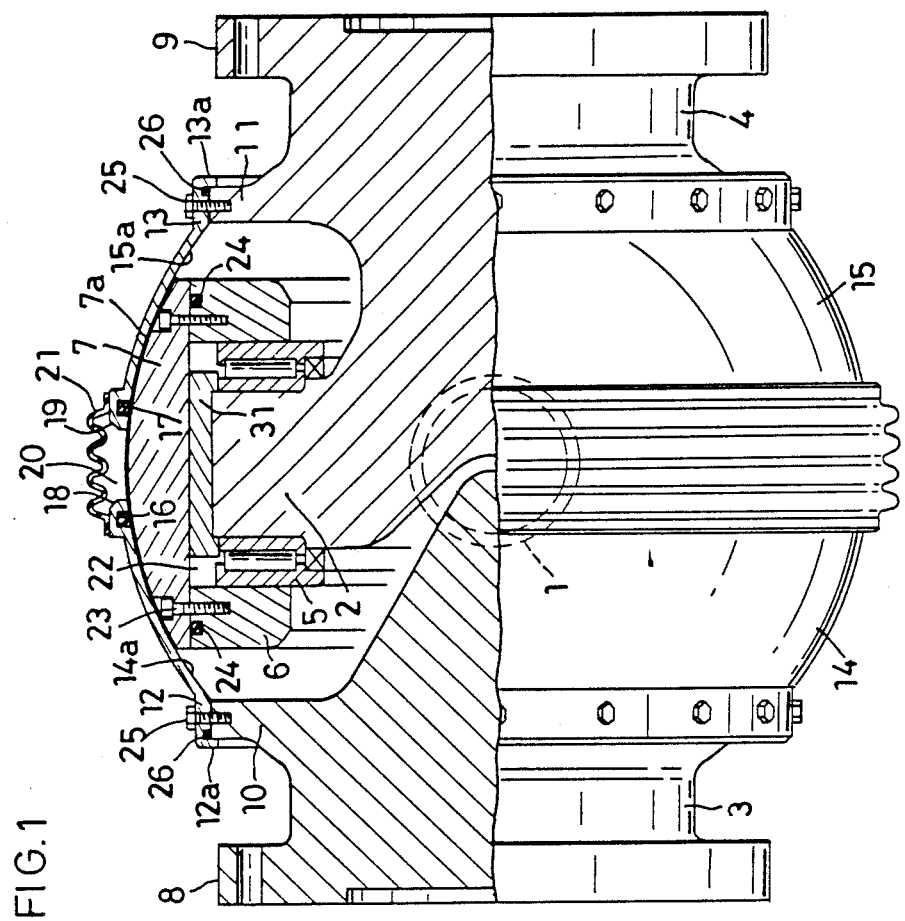
FIG. 1 is a side elevation partly broken away and showing a universal joint embodying the invention.
Figure 2:
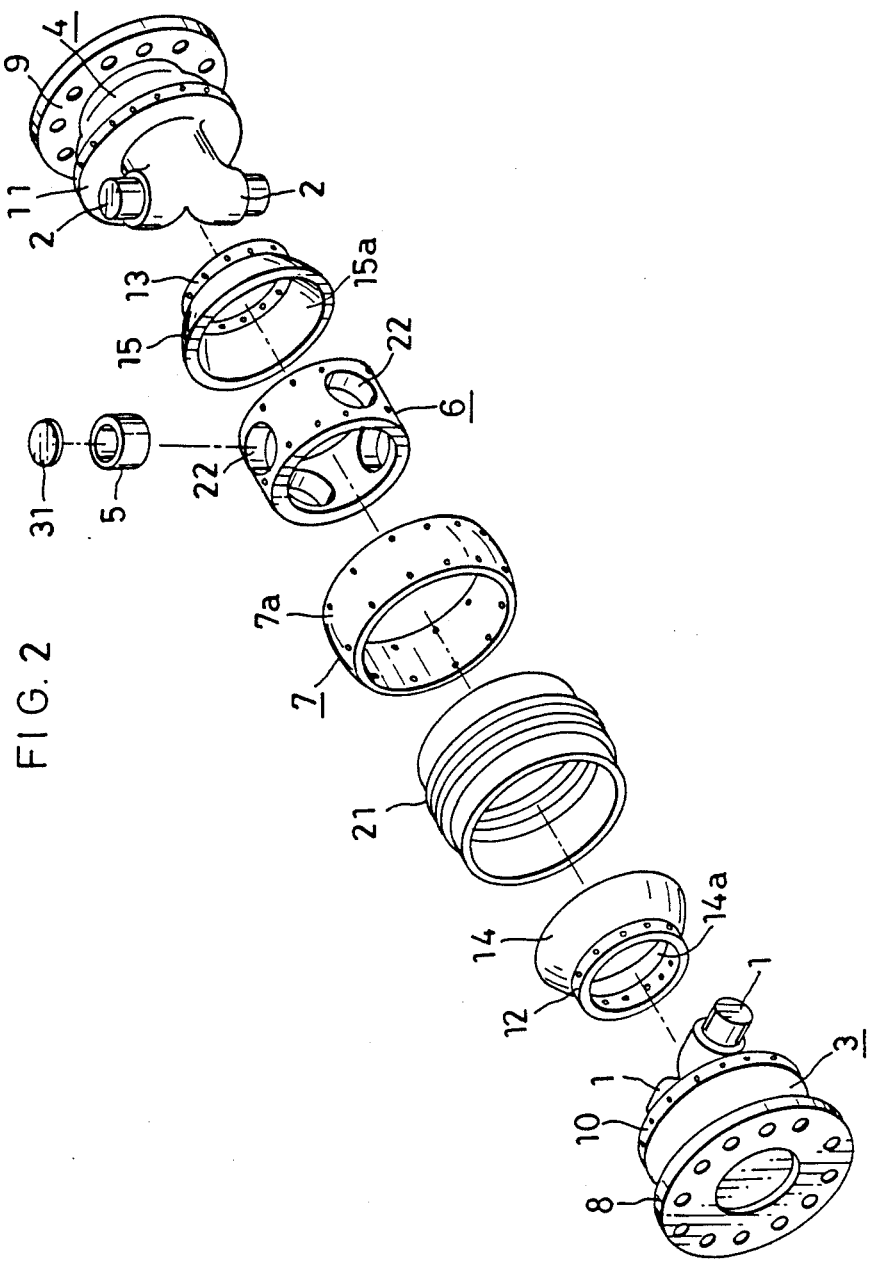
FIG. 2 is an exploded perspective view of the embodiment of FIG. 1.

FIGS. 1 and 2 show an embodiment of the invention, i.e., a universal joint of the type having an intermediate ring. More specifically, the joint includes a pair of yokes 3, 4 each having two trunnions 1, 2 projecting radially thereof, and an annular intermediate ring 6 having bearings 5 arranged on two diametrical lines thereof intersecting each other at right angles for supporting the respective trunnions 1, 2. An annular central cover 7 having a spherical outer surface 7a is fixedly intimately fitted around the intermediate ring 6. Between the intermediate ring 6 and connecting flanges 8, 9 at the outer ends of the yokes 3, 4, collars 10, 11 are formed on the yokes 3, 4, respectively. A pair of annular side covers 14, 15 having spherical inner surfaces 14a, 15a slidable in contact with the spherical outer surface 7a of the central cover 7 have outer end portions 12, 13 which are bent to extend horizontally in section and are fixed to the peripheral surfaces of the collars 10, 11. Annular seal members 16, 17 in intimate contact with the outer surface 7a of the central cover 7 are provided at the inner end portions of the respective side covers 14, 15. The inner ends of the side covers 14, 15 are spaced apart from each other by a clearance 20 required for the sliding movement of the side covers. The connecting flanges 8, 9 have such a diameter as to permit the annular side covers 14, 15 to pass thereover.

A bellows 21 is provided between and secured to the inner end portions 18, 19 of the two side covers 14, 15 for covering the clearance 20 to hold the most important bearing assembly watertight and protect the assembly from corrosion.

Four bearing holes 22 are formed in the intermediate ring 6. A washer 31 is interposed between the central cover 7 and the end face of each of the trunnions 1, 2 and the end face of the inner ring of each bearing 5. The central cover 7 is fixed to the intermediate ring 6 with setscrews 23. An O-ring is fitted in a groove formed in the outer surface of the intermediate ring 6 at each of opposite sides thereof to provide a seal between the central cover 7 and the intermediate ring 6. The outer end portions 12, 13 of the side covers 14, 15 are fixed to the peripheries of the collars 10, 11, respectively, with setscrews 25. An O-ring is fitted in a groove formed in the inner surface of the outer end portion of each of the side covers 14, 15 to provide a seal between the collar 10 (11) and the side cover 14 (15). The side covers 14, 15 are provided at their outer ends 12, 13 with short bent portions 12a, 13a in engagement with the outer corners of the collars 10, 11, respectively. O-rings are used as the seal members 16, 17 and fitted in grooves formed by bending the inner end portions 18, 19 of the side covers 14, 15 so that each groove opening faces the central cover 7.

Figure 3:
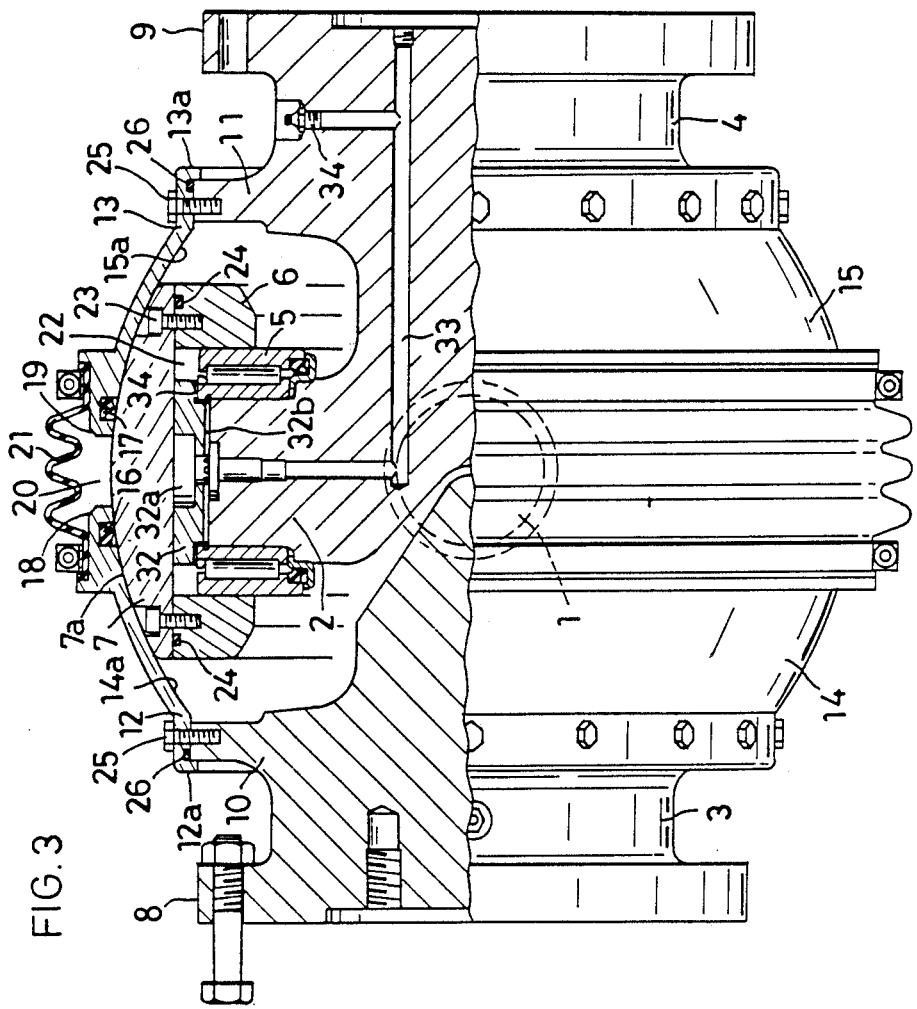
FIG. 3 is a side elevation corresponding to FIG. 1 and showing another universal joint embodying the invention.

FIG. 3 shows another universal joint embodying the invention. Throughout FIGS. 1 to 3, like parts are designated by like reference numerals.

This embodiment has a lubricant channel 33 for supplying a lubricant to the bearings 5.

The lubricant is supplied through a grease nipple 34 formed in the base portion of each of the flanges 8, 9, flows through the channel 33, is collected in an oil well 32a formed in each of washers 32 and is applied to the bearing 5 through radial oil grooves 32b formed in the surface of the washer 32 in contact with the end face of the trunnion 1 or 2. A clearance 34 for passing the lubricant therethrough is formed between the washer 32 and the end face of the inner ring of the bearing.

FIGS. 4 and 5 show universal joints J of the invention as used for a mooring device.

The mooring device comprises two universal joint assemblies 29 arranged between a pier 27 and the structure 28 to be moored, and a universal joint assembly 29 provided between a dolphin 30 and the structure 28, whereby the structure 28 is moored. Each of the universal joint assemblies 29 has a damper 29a installed on the pier 27 or the dolphin 30.

What is claimed is:

1. A universal joint including a pair of yokes each having two trunnions projecting radially thereof, and an annular intermediate ring having bearings arranged on two diametrical lines thereof intersecting each other at right angles for supporting the respective trunnions of the yokes, the universal joint comprising an annular central cover fixedly intimately fitted around the intermediate ring and having a spherical outer surface, a collar formed on each of the yokes and positioned between the intermediate ring and a connecting flange at the outer end of the yoke, a pair of annular side covers each having an outer end portion of horizontal section fixed to the periphery of the collar in intimate contact therewith and a spherical inner surface slidable in contact with the spherical outer surface of the central cover, and an annular seal member provided at the inner end portion of each of the side covers and in intimate contact with the outer surface of the central cover, the inner ends of the pair of side covers being spaced apart from each other by a clearance required for the sliding movement of the side covers, the connecting flange being so sized as to permit the side cover to pass thereover.

2. A universal joint as defined in claim 1 wherein a bellows is provided between and secured to the inner end portions of the pair of side covers for covering the clearance.

3. A universal joint as defined in claim 1 wherein the bearings are inserted individually in four bearing holes formed in the intermediate ring, and a washer is interposed between the central cover and the end face of each of the trunnion and the end face of the inner ring of each bearing.

4. A universal joint as defined in claim 1 wherein the outer surface of the intermediate ring is formed in each of its opposite side portions with a groove having fitted therein an O-ring providing a seal between the central cover and the intermediate ring.

5. A universal joint as defined in claim 1 wherein each of the side covers is formed in the inner surface of its outer end portion with a groove having fitted therein an O-ring providing a seal between the collar and the side cover.

6. A universal joint as defined in claim 1 wherein each of the side covers is provided at its outer end with a short bent portion in engagement with the outer corner of the collar.

7. A universal joint as defined in claim 1 wherein the seal member is an 0-ring fitted in a groove formed by bending the inner end portion of the side cover so that the groove opening faces the central cover.

8. A universal joint as defined in claim 1 further having a lubricant channel for supplying a lubricant to the bearings.

* * * * *